United States Patent Office 3,346,567
Patented Oct. 10, 1967

3,346,567
PREPARATION OF ε-CAPROLACTAM
Jan van Westerveld and Guillaume A. T. Sligchers, Geleen, Netherlands, assignors to Stamicarbon N.V., Heerlen, Netherlands
No Drawing. Filed Jan. 17, 1966, Ser. No. 520,882
Claims priority, application Netherlands, Jan. 19, 1965, 65—631
3 Claims. (Cl. 260—239.3)

The present invention relates to the preparation of ε-caprolactam by reaction of ε-caprolactone with ammonia.

It is known (see U.S. Patent No. 3,000,880, the disclosure of which is incorporated herein by reference) that by reaction of ε-caprolactone with ammonia, under conditions of elevated pressure and above the critical temperature, the desired ε-caprolactam may be obtained, but is accompanied by large amounts of other undesired products. Reversible reactions are involved, so that a complex of equilibria may be established in the reaction mixture with the effect that the lactam pass yield will not be more than approximately 50%. After removal of the lactam, further amounts of lactam can be obtained from the remaining products, for instance by again reacting these products with ammonia in a cyclic flow system.

The present invention has as its principal object the provision of an improved process wherein the pass yield of ε-caprolactam is materially improved, and reduced amounts of by-products need to be recycled.

It has now been found that in preparing ε-caprolactam by reacting ε-caprolactone with ammonia at temperatures in the range of about 200–475° C. and under superatmospheric pressure and removing ε-caprolactam from the reaction mixture, a larger yield of lactam is obtained and smaller amounts of the by-products need be processed if the reaction mixture is rapidly chilled before separating off the ε-caprolactam.

Chilling the reaction mixture is done according to this invention by abruptly cooling the mixture to a temperature between about 15°–100° C., preferably to between about 25°–50° C. The ratio between the components of the reaction mixture which has been established at the elevated reaction temperature is hardly changed by this sharp decrease in the temperature. On the contrary, if cooling is effected only in the customary way of allowing the temperature of the reaction mixture to drop gradually, during the time of this slow temperature drop the ratio between the components of the mixture changes with the result that the amount of recoverable lactam decreases.

Preferably the reaction mixture is cooled to the chilled temperature range, according to this invention, within about 1 to 20 minutes.

The reaction mixture may be chilled according to this invention either indirectly, e.g. by external cooling, or directly, e.g. with the aid of a cold solvent or ice.

Theoretically, the conversion of caprolactone to caprolactam, requires one mole of ammonia per mole of lactone and yields one mole of water. As a rule, however, ammonia is used in excess, for instance from 2, 3, 5, 15, 30 or to 50 moles of ammonia per mole of lactone. If smaller amounts, e.g. 0.75 of 0.50 mole of ammonia are used per mole of lactone, the degree of conversion will be lower.

The ammonia can be used in the form of dry ammonia gas or as aqueous ammoniacal solution.

The conversion can also be effected in the presence of solvents. Examples of suitable solvents are water, pyridine and lower alkyl ethers, such as dibutyl ether, diamyl ether and dioxane, and, furthermore, aryl and alkane liquid hydrocarbons, such as toluene, xylene, decahydronaphthalene, heptane and octane.

The reaction temperature at which the conversion is effected may be varied between about 200 and 475° C. Below 200° C., the conversion to caprolactam is practically nil, while the use of very high temperatures above 475° C. offers no advantages, and only complicates the procedure.

The elevated pressures used in the process can be varied. The pressure depends on the amount of ammonia used and also on other reaction conditions, such as the temperature. The pressure may, furthermore, be varied by introducing inert gas, such a nitrogen or hyrocarbon vapour, into the reaction chamber. In general, pressures of about 50, 100, 200, 300 and 500 at. may, for instance be applied.

After chilling the reaction mixture pursuant to this invention, the caprolactam can be separated therefrom in a known way, for instance by extraction.

The by-products formed, such as ε-hydroxy caproic acid amide, ε-hydroxycapronitrile and caprolactam polymer, can then be recirculated for further reaction in the ammonia to yield further amounts of lactam.

The caprolactone used as starting material can also be in the form of polymeric caprolactone.

The following examples will further illustrate the nature of this invention, which is not, however, limited to these specific procedures.

Example I 114 g. of ε-caprolactone and 600 g. of 25% aqueous ammonia are heated in a 2-litre autoclave for 5.5 hours at 320° C., the pressures measured at this temperature being between 150 and 155 at.

Immediately upon completion of this heat treatment the reaction mixture is chilled by forcing it out of the autoclave through a cooled tube (temperature 0° C.), which reduces the temperature of the mixture from 320 to about 30° C. within about 6 minutes.

After that, the aqueous reaction mixture is extracted with chloroform. The chloroform solution is separated from the aqueous phase and distilled, yielding 80.5 g. of ε-caprolactam (yield 71%).

The further treatment of the aqueous phase is described in Example II.

The results of a number of experiments carried out under different reaction conditions, but following the above-described procedures of chilling and further treatment, are given in the following table.

| Molar ratio, $H_2O$/lactone | Molar ratio, $NH_3$/lactone | Temp. (° C.) | Time (hours) | Lactam Yield (percent) |
|---|---|---|---|---|
| 25 | 8.8 | 320 | 5.5 | 71 |
| 12.5 | 4.4 | 320 | 5.5 | 65 |
| 8.3 | 2.9 | 320 | 5.5 | 61 |
| 25 | 8.8 | 320 | 2 | 45 |
| 25 | 8.8 | 320 | 3 | 58 |
| 25 | 8.8 | 340 | 3 | 75 |
| 25 | 8.8 | 360 | 3 | 84 |

If, in deviation from the invention, the reaction mixture is not chilled immediately upon completion of the heat treatment, but is, say, cooled from 320 to 30° C. by allowing it to stand for about 10 hours, only 33% of ε-caprolactam may be obtained after extraction of the mixture and distillation of the extract.

Example II

The aqueous phase left after extraction of the lactam solution with chloroform as described in Example I, is fed back to the autoclave and heated at 320° C. for 5.5 hours. The reaction mixture is chilled in the way described in Example I and the lactam is recovered by extraction with chloroform. 26 g. of ε-caprolactam are obtained (yield 23% of original feed).

The aqueous phase left in the extraction is again fed to the autoclave and once more heated at 320° C. for 5.5 hours. The reaction mixture is chilled and extracted again. The amount of ε-caprolactam obtained is 4.5 g. (yield 4% of original feed).

Consequently, the total lactam yield in this series of experiments is 98%.

*Example III*

114 g. of ε-caprolactone polymer and 600 g. of 25% aqueous ammonia are heated in a 2-litre autoclave for 5 hours at 360° C., the pressures measured at this temperature being between 235 and 265 at.

Immediately upon completion of the heat treatment the reaction mixture is chilled in the way described in Example I to a temperature of about 40° C. in about 5 minutes.

After that, it is extracted with chloroform, and the chloroform solution is distilled, yielding 93 g. of ε-caprolactam (yield 82%).

*Example IV*

114 g. of ε-caprolactone, 60 g. of dry ammonia and 600 g. of dioxane are heated in a 2-litre autoclave for 5 hours at 320° C., the pressures measured at this temperature being between 58 and 60 at.

The reaction mixture is chilled in the way described in Example I to a temperature of about 50° C. in about 4 minutes.

After that, it is distilled in vacuo, yielding 79 g. of ε-caprolactam (yield 70%).

It will be understood that the practice of this invention is not limited to the specific embodiments set forth above, but only by the spirit and scope of the following claims.

What is claimed is:

1. In processes for the preparation of ε-caprolactam by reaction of ε-caprolactone with ammonia at an elevated temperature in the range of about 200–475° C. and under superatmospheric pressure, followed by removing of ε-caprolactam from the reaction mixture, the improvement consisting essentially in rapidly chilling the reaction mixture to a lower temperature in the range of about 15 to 100° C., and thereafter extracting the ε-caprolactam therefrom.

2. Process according to claim 1 wherein said reaction mixture is chilled to a temperature in the range of about 25–50° C.

3. Process according to claim 1 wherein said reaction mixture is chilled to said lower temperature within about 1 to 20 minutes.

References Cited

UNITED STATES PATENTS 3,000,880  9/1961  Phillips et al. _____ 260—239.3

WALTER A. MODANCE, *Primary Examiner.*

R. T. BOND, *Assistant Examiner.*